Sept. 10, 1957 C. F. GIMSON ET AL 2,806,183
ELECTRO-MAGNETIC CONTROL DEVICES
Filed Nov. 25, 1953 2 Sheets-Sheet 1

INVENTORS
CYRIL FREDERICK GIMSON,
JOHN OWEN TATTERSALL,
BY
ATTORNEY

United States Patent Office 2,806,183
Patented Sept. 10, 1957

2,806,183
ELECTRO-MAGNETIC CONTROL DEVICES

Cyril Frederick Gimson, Dunchurch, near Rugby, and John Owen Tattersall, Edenbridge, England, assignors to The British Thompson-Houston Company Limited, a British company Application November 25, 1953, Serial No. 394,406

Claims priority, application Great Britain November 27, 1952

10 Claims. (Cl. 317—27)

This invention relates to electro-magnetic control devices such as may be utilized in the operation of protective gear applied to polyphase circuits.

The object of the invention is to provide an electro-magnetic device capable of rapidly releasing its armature in response to the occurrence of a fault in a polyphase circuit which results in the unbalance of its phase currents or voltages and thus to initiate the operation either of a protective device to remove the fault condition, or of means for indicating the presence of a fault.

An electro-magnetic operating device for an N-phase electric circuit controller, according to the invention, comprises N-electro-magnets providing N-pairs of pole pieces extending into parallel juxtaposed relation to one another to co-operate with a common armature, an exciting winding adapted to be energized with direct current for magnetizing the pole pieces with alternate opposite polarity and a control winding embracing the pole pieces and adapted, when carrying a resultant out-of-balance current derived from the polyphase circuit, to deflect the direct magnetic flux entering the armature from the pole pieces as a result of the direct energization of the exciting winding and thereby to cause the release of the armature and a resultant operation of a protective or indicating device.

While a single exciting winding may be located so as to embrace all the cores, a separate winding may be used around one or both of the limbs of each of the U-shaped cores; the releasing winding may be in the form of a single copper strip carrying the out-of-balance current and wound in zig-zag fashion to weave in and out around adjacent pole pieces.

Since the operation of the device depends on diverting the direct flux originating with the exciting winding(s) from the armature, it may be desirable to provide, at some distance back from the pole faces, a shunt magnetic path for the flux so diverted.

To enable the invention to be more readily understood, we will now described, with reference to the accompanying drawings, an arrangement embodying the invention.

Figure 1:
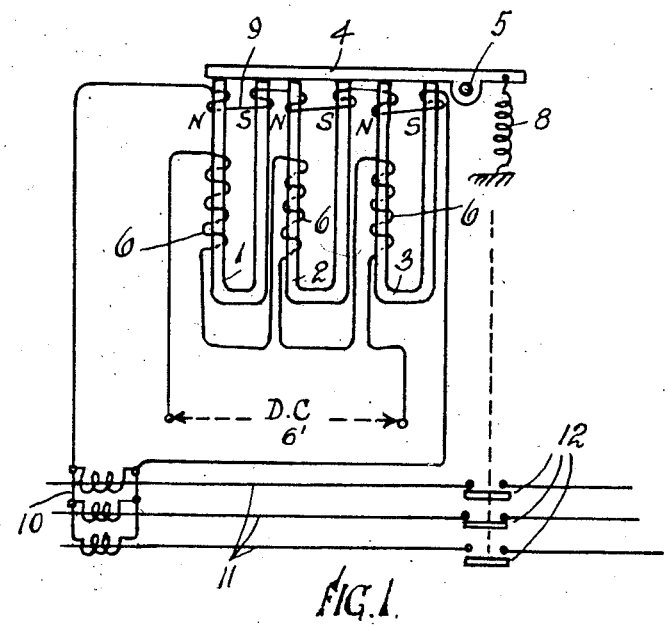
Figures 2, 3:
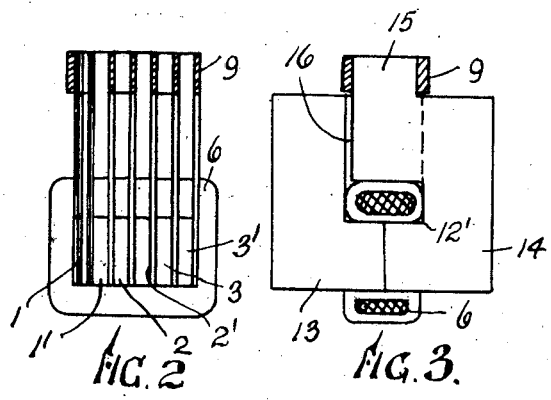
Figure 4:
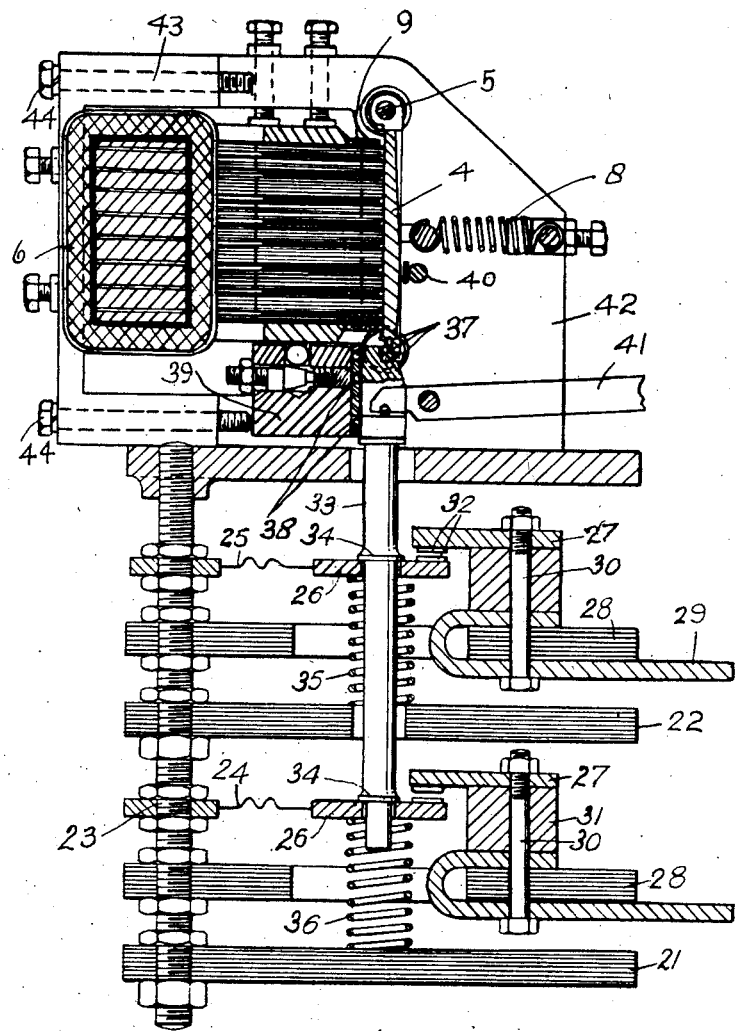

In the drawings, Fig. 1 is a schematic diagram to illustrate the manner in which the electro-magnetic device is constructed and functions; Figs. 2 and 3 are a side view and an end view, respectively, of the electro-magnet with its windings; and Fig. 4 is a cross section of an electric circuit controller embodying an electro-magnetic device of the invention.

Referring to Fig. 1, we have indicated our electro-magnetic device as applicable to a three-phase circuit and thus comprising three magnetic cores 1, 2, 3 located face-to-face with their pole pieces in juxtaposed parallel relation and arranged to co-operate with an armature 4 pivotally mounted at 5. The cores are of U-shape and have their juxtaposed poles adapted to be magnetized to be alternately of opposite polarity by means of an energizing winding 6 connectible to a source of direct energizing potential 6', as indicated. The armature 4 is biased away from its position adjacent the pole pieces by means of a spring 8, and the pole pieces are associated, adjacent their tips, with a winding 9 indicated as being wound to provide a substantially complete turn, or a number of turns, around each pole piece but in opposite directions around adjacent pole pieces. A single conductor made to weave in and out between successive pole pieces will produce the desired result. The winding 9 is connected to a current transformer 10 having windings associated with each phase of the three-phase circuit 11 with which the electro-magnetic device is operatively connected. The current transformers have their windings connected in parallel and to the winding 9 so that the winding 9 carries any out-of-balance current obtained from the current transformers 10.

When winding 6 is enegized by direct current, flux flows into the armature 4 from adjacent pairs of pole pieces to attract the armature and maintain it against the pole tips against the bias of spring 8. In the event of the circuit 11 becoming unbalanced, an unbalance current flows through winding 9 and causes the direct flux from the pole pieces to be diverted away from the armature 4 and thereby to release it. As a result of the bias provided by spring 8, it moves to the unattracted position, and as an indication of how this operation can be used to protect the circuit 11, we have indicated the armature as being connected to operate contacts 12 connected in the phases of the circuit 11 so that, in the event of out-of-balance on the circuit 11, the contacts 12 will be opened, thus disconnecting the circuit from its source of supply.

In Figs. 2 and 3 we have shown the manner in which the cores can be constructed to enable their pole pieces to extend parallel to a plane containing the limbs of the core. Each core is made in two halves, each of flat strip, or preferably a stack of laminations. Each half core consists of a rectangular core section of magnetizable material having a window 12' for receiving the energizing coil 6, one limb of the core section being extended at 15 to form the pole piece around which the control winding 9 is passed. The core section is also provided with an air gap 16 adjacent the pole piece into which the flux is diverted when winding 9 is energized. By assembling together two core sections such as shown in Fig. 3 with the parts arranged so that the air gap 16 appears on opposite sides of the pole piece 15, and embracing the assembled half-cores by a single exciting winding 6, the pole pieces of the two core sections will be of opposite polarity. Each core section is itself preferably formed from two generally L-shaped parts 13, 14 having limbs of unequal length assembled to form a generally rectangular magnetic circuit. The core sections are separated from one another by magnetic spacers which may be shaped similarly to the part 13 to allow for the introduction of the control winding 9.

In Fig. 4 we have illustrated a circuit controller fitted with the electro-magnetic device of the invention. The circuit controller forms no part of the present application, but is described and claimed in co-pending patent application Serial Number 391,350, of John A. Watson, now Patent No. 2,785,241, assigned to the same assignee as the present application. The circuit controller is of the kind embodying two banks of contacts simultaneously controllable by a single operating member. The controller is built up basically from the insulating members 21, 22, in the form of discs spaced apart from one another by pillars 23 of which there are three in number shown spaced equidistantly around the periphery of the discs. In the arrangement shown, the pillars 23 are of metal since this is suitable for the purpose in view, although in many cases it will be necessary to use insulating material for the pillars. Mounted on the pillars and located on either side of the insulating member 22 are the flexible contact-carrying diaphragms 24, 25. The diaphragms are made each of generally star-shape, and are supported by having their extending arms clamped to the pillars 23 so that the diaphragms are located in parallel relation with the insulating members 21, 22. The arms of the diaphragms 25 are corrugated, as shown, in order to increase flexibility. At their central portions the diaphragms carry contacts 26. These contacts are adapted to engage with, and disengage from, contacts 27 arranged in two banks, each bank co-operating with an individual contact 26. The contact 27, of which there are three in each bank, are disposed in equiangular relation to one another and are symmetrically spaced between the arms of the diaphragms. The contacts 27 are mounted on insulating members 28, similar to the members 21, 22, which are also supported by being clamped on the pillars 23. The contacts 27 are each connected to conductors 29 which are preferably in the form of laminated copper strips, the strips being bent into a U to embrace the insulating members 28 and are clamped to the contacts 27 by bolts 30, passing through spacers 31. The contacts 26, 27 are each provided with engaging surfaces formed by buttons 32 of highly electrically conductive material.

Simultaneous actuation of the contacts 26 is provided by an operating rod 33 extending through central aligned apertures in the insulating members, the rod being provided with shoulders 34 which abut against the contacts 26. The contacts are biased upwardly by means of springs 35, 36, the upper 35 of which surrounds the operating rod 33 and abuts against the insulating member 22, while the lower 36 abuts against the insulating member 21. The diaphragms 25 centrally locate the contacts 26 and the operating rod 33, which is thus maintained in a position in which it extends axially of the whole assembly. The diaphragms 25 by performing the function of locating the actuating rod, avoid the necessity for any conventional form of bearing for the rod 33. As a result of the avoidance of such a bearing, the frictional restraint against rapid movement of the contacts is substantially reduced, thus increasing the operating speed of contact movement.

In the arrangement shown, since the operating rod is biased upwardly by the springs 35, 36, the contacts 26, 27, tend to move to the closed position. For the purpose for which the circuit controller is intended, the closure of the contacts 26, 27 is desired to be effected with a minimum delay after the initiation of a circuit controlling operation. The contact rod may be restrained against the bias by means of toggle mechanism as disclosed in our co-pending application Serial Number 391,356 assigned to the same assignee as the present application, the closure of the contacts being effected in response to the deenergization of the electro-magnetic control device of Figs. 1 to 3 controlling the armature 4 which allows the toggle to collapse and the contacts to close under the influence of the springs 35, 36.

The toggle mechanism consists of three rollers 37 located with their peripheries in contact with one another and their longitudinal axes in substantially a common plane, the common plane making a small angle of inclination with reference to the axis of the actuating rod 33. The rollers are supported between parallel abutments provided by the walls of shoulders on the armature 4 and the actuating rod 33. This arrangement creates a sideways thrust on the upper end of rod 33 which is taken by rollers 38 recessed into the face of an adjustably mounted supporting member 39. The armature is biased by spring 8 towards a stop 40.

When the armature 4 is attracted to the pairs of pole pieces formed on the electro-magnets 1, 2, 3, the angle of inclination made between the plane passing through the axes of rollers 37 and the axis of rod 33 is reduced and the rod 33 is depressed to open contacts 32. If, due to energization of the winding 39 with alternating current, electro-magnetic operating device releases armature 4 until it rests against the stop 40 under the action of spring 8, the angle of inclination of the plane through the axes of rollers 37 with relation to the axis of rod 33 increases, permitting the actuating rod 33 to rise under the influence of spring 35 and the inherent resilience of the diaphragms 25, whereby contacts 32 close. A manually operated lever 41 is provided for moving actuating rod 33 in a direction to open the contacts 32.

The electro-magnetic operating mechanism is positioned between a pair of supporting arms 42, the electro-magnets being clamped to the arms by a channel-shaped clamping member 43 held by bolts 44.

Although we have described one construction embodying an electro-magnetic operating mechanism of the invention, it will be understood that many modifications in the construction may be made without departing from the invention as set forth in the appended claims, such for example, as employing a permanent magnet for polarising the electro-magnets.

What we claim as new and desire to secure by Letters Patent of the United States is:

1. An electro-magnetic operating device for an N-phase electric circuit controller comprising N electro-magnets providing N pairs of pole pieces extending into parallel juxtaposed relation to one another, a common armature co-operating with said pole pieces, means for biasing said armature from said pole pieces, an exciting winding for energization with direct current for magnetizing said electro-magnets so that said pole pieces become of alternate opposite polarity and attract said armature against said bias and an alternate current control winding embracing said pole pieces, said control winding when energized, deflecting the direct magnetic flux entering said armature from said pole pieces, to cause the release of said armature.

2. An electro-magnetic operating device as claimed in claim 1, having means responsive to out-of-balance current on an N-phase circuit for energizing said alternating current control winding whereby to cause, through release of said armature, operation of said circuit controller.

3. An electro-magnetic operating device for an N-phase electric circuit controller comprising N magnetic cores providing N pairs of pole pieces extending into parallel juxtaposed relation to one another, said magnetic cores being each constructed of substantially rectangular laminations the planes of which extend parallel to said pairs of pole pieces, each of said laminations having a window for an exciting coil and being provided with an air gap arranged in proximity to an extension from one side of said rectangular lamination to form said pole piece, an exciting coil for energization with direct current for magnetizing said cores so that said pole pieces become of alternate opposite polarity, a common armature co-operating with said pole pieces, means for biasing said armature away from said pole pieces, and a control winding co-operating with said pole pieces, energization of said control winding serving to divert the direct magnetic flux entering said armature from said pole pieces and cause said flux to flow across said air gaps in said laminations whereby to effect the release of said armature under the influence of said bias.

4. A magnetic core comprising a pair of magnetic half core sections assembled face-to-face to provide a pair of pole pieces in juxtaposed relation, each of said pairs of half-core sections consisting of a rectangular core section of magnetizable material having a window for receiving an energizing winding, one limb of the core section being extended to form one of said pair of pole pieces, and an air gap in said core section adjacent to said pole piece, said air gaps lying on opposite sides of said window and said respective pole pieces when said core sections are assembled together in face-to-face relation with the windows in said core sections in alignment.

5. A magnetic core as claimed in claim 4 wherein each of said core sections is formed from a stack of laminations, each of said laminations comprising two generally L-shaped parts having limbs of unequal lengths.

6. An electro-magnetic operating device for an N-phase electric circuit controller comprising N electro-magnets providing N pairs of pole pieces extending into parallel juxtaposed relation to one another, a common armature co-operating with said pole pieces, means for biasing said armature from said pole pieces, means for premagnetizing said electro-magnets so that said pole pieces become of alternate opposite polarity and attract said armature against said bias and an alternate current control winding embracing said pole pieces, said control winding when energized, deflecting the direct magnetic flux entering said armature from said pole pieces to cause the release of said armature.

7. An electro-magnetic operating device for an N-phase electric circuit controller comprising N electro-magnets providing N pairs of pole pieces extending in parallel juxtaposed relation to one another, a common armature cooperating with said pole pieces, means for biasing said armature away from said pole pieces, means for premagnetizing said electro-magnets so that said pole pieces become of alternate opposite polarity to attract said armature against said bias, and means to deflect the direct magnetic flux entering said armature from said pole pieces, whereby said armature is retracted by said biasing means.

8. An electro-magnetic operating device for an N-phase electric circuit controller comprising N electro-magnets providing N pairs of pole pieces extending in parallel juxtaposed relation to one another, a common armature cooperating with said pole pieces, means for biasing said armature away from said pole pieces, means for premagnetizing said electro-magnets so that said pole pieces become of alternate opposite polarity to attract said armature against said bias, and directive magnetic flux deflecting means responsive to phase unbalance in said N-phase electric circuit and positioned adjacent said pole pieces whereby said armature is retracted from said pole pieces upon the occurrence of phase unbalance.

9. An electro-magnetic operating device for an N-phase electric circuit controller comprising electro-magnet means having at least one pair of pole pieces, an armature for said pole pieces, means for biasing said armature from said pole pieces, means for premagnetizing said electromagnet means so that said pole pieces are of alternate opposite polarity and attract said armature against said bias, and directive magnetic flux deflecting means responsive to phase unbalance in said N-phase circuit positioned adjacent said pole pieces, whereby said armature is moved away from said pole pieces upon the occurrence of phase unbalance.

10. An electro-magnetic operating device for an N-phase electric circuit controller comprising N electro magnets having N pairs of pole pieces extending in parallel juxtaposed relation to one another, a common armature cooperating with said pole pieces, means for biasing said armature from said pole pieces, an exciting winding for premagnetizing said electromagnets so that said pole pieces are of alternate opposite polarity and attract said armature, a source of direct current connected to said exciting winding, means for detecting phase unbalance between any two of said N phases, an alternate control winding operatively positioned relative to said pole pieces for deflecting the direct magnetic flux and connected to said detecting means, and means operatively connecting said armature to said circuit controller.

References Cited in the file of this patent

UNITED STATES PATENTS

| 969,809 | Simon | Sept. 13, 1910 |
| 1,222,052 | Walker | Apr. 10, 1917 |
| 1,728,840 | Stravostrand | Sept. 17, 1929 |
| 2,300,886 | Goldsborough | Nov. 3, 1942 |
| 2,525,930 | Mevorach | Oct. 17, 1950 |
| 2,604,165 | Prue | July 22, 1952 |

FOREIGN PATENTS

| 871,775 | France | May 9, 1942 |